(12) United States Patent
Murase

(10) Patent No.: US 7,596,674 B2
(45) Date of Patent: Sep. 29, 2009

(54) DATA MANAGED STORAGE SYSTEM FOR REGULATORY COMPLIANCE

(75) Inventor: Atsushi Murase, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 561 days.

(21) Appl. No.: 11/412,968

(22) Filed: Apr. 28, 2006

(65) Prior Publication Data
US 2007/0255770 A1    Nov. 1, 2007

(51) Int. Cl.
*G06F 12/00* (2006.01)
*G06F 15/167* (2006.01)

(52) U.S. Cl. .................... 711/170; 711/154; 709/213; 709/216

(58) Field of Classification Search ............... None
See application file for complete search history.

(56) References Cited

U.S. PATENT DOCUMENTS

| 6,907,498 | B2 | 6/2005 | Kitamura et al. | |
|---|---|---|---|---|
| 2003/0115313 | A1* | 6/2003 | Kanada et al. | 709/223 |
| 2004/0199566 | A1* | 10/2004 | Carlson et al. | 709/201 |
| 2006/0242377 | A1* | 10/2006 | Kanie et al. | 711/165 |
| 2008/0104350 | A1* | 5/2008 | Shimizu et al. | 711/165 |

OTHER PUBLICATIONS

Simpson, Nik (Sentric Inc.), "ILM: Tiered Storage & The Need for Classification", Storage Networking Industry Association, 2006, pp. 1-27.

* cited by examiner

*Primary Examiner*—Jack A Lane
(74) *Attorney, Agent, or Firm*—Mattingly & Malur, P.C.

(57) ABSTRACT

A system and method for automatically managing the storage of data in a storage service provider's (SSP's) storage system in compliance with regulatory requirements receives a request from a user for storing the user's data at the SSP. The SSP provides an interface which gathers information from the user and determines relevant regulations and data classes for the user's data. Based on the gathered information, the SSP issues a request for data management parameters corresponding to the determined regulation and data class from a data management regulation site. The SSP receives the relevant data management parameters and allocates storage space for storing the user's data in accordance with the data management parameters received from the data management regulation site. Additionally, if a regulation relevant to the user's data is changed or updated, the invention provides the user with the option of automatically migrating the user's data to the updated parameters.

20 Claims, 23 Drawing Sheets

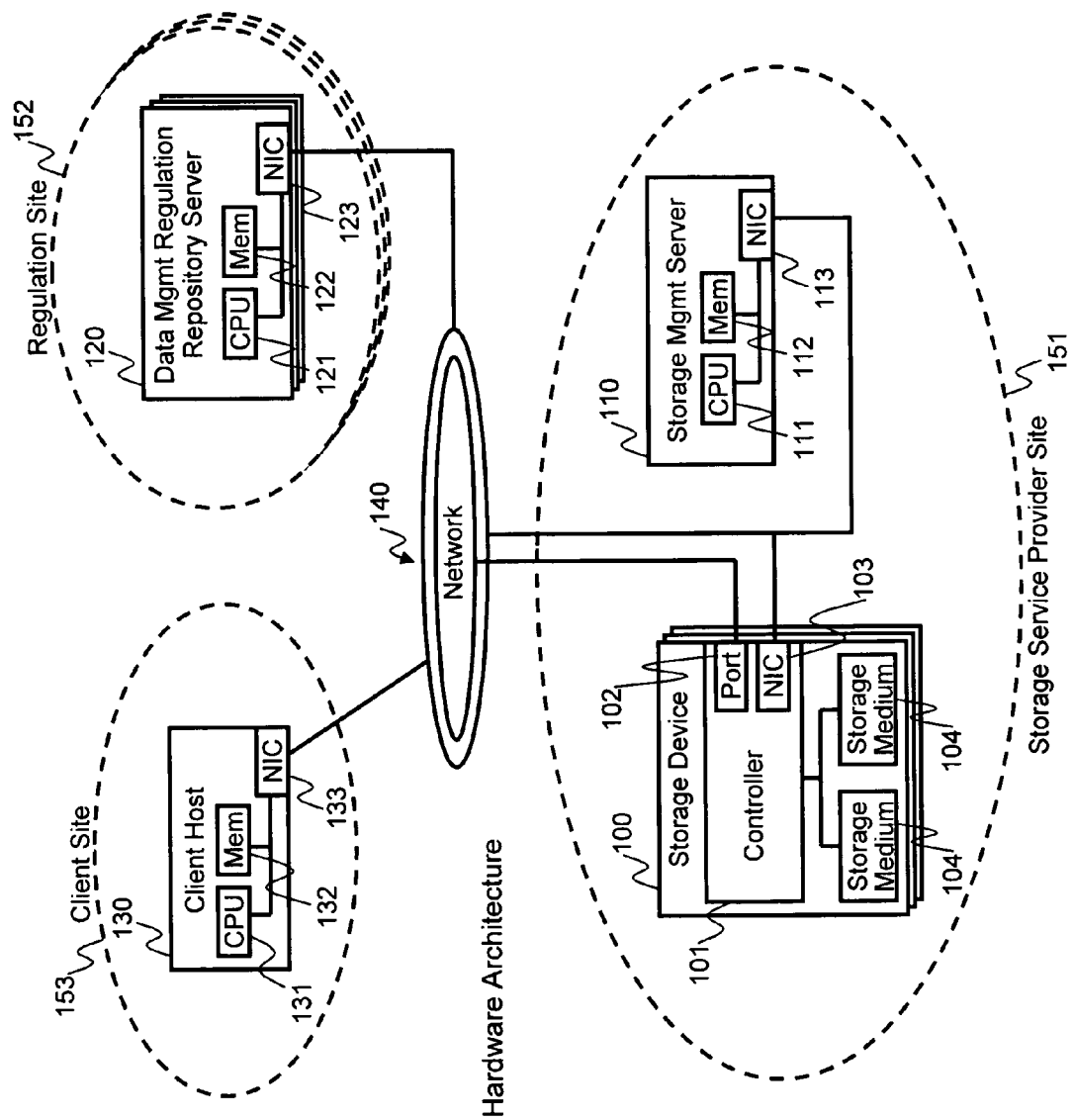
FIG. 1 Hardware Architecture

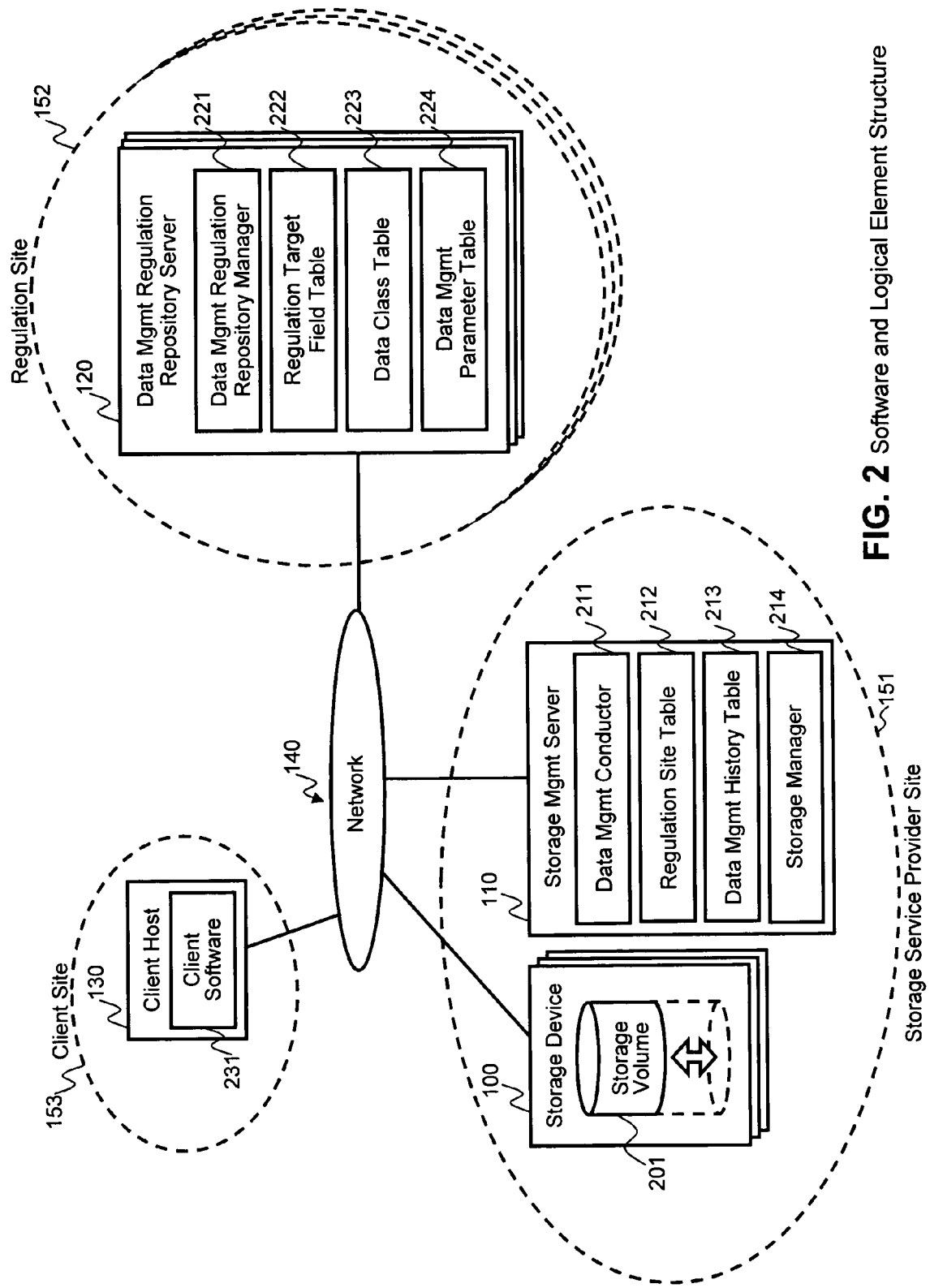
FIG. 2 Software and Logical Element Structure

| RegulationID | Location |
|---|---|
| FNC | www.fncdma.org/repository/ |
| MFT | www.mftdma.org/repository/ |
| HLC | www.hlcdma.org/repository/ |
| ... | ... |

FIG. 3 Data Structure of Regulation Site Table

| RegulationID | Description |
|---|---|
| FNC | "Financial services" |

FIG. 4 Data Structure of Regulation Target Field Table

| ClassID | Description |
|---|---|
| C1 | "Banking Transaction Log" |
| C2 | "Customer Support Phone Call" |
| C3 | "Customer Profile" |
| C4 | "Employee Email" |
| ... | ... |

FIG. 5 Data Structure of Data Class Table

| ClassID | Parameter | Type | Value |
|---|---|---|---|
| C1 | Over Write Prevention | Boolean | TRUE |
| C1 | Preservation Term | Date | 6 Years |
| C1 | Remote Redundancy | Integer | 2 |
| C1 | Latency to the 1st byte | Date | 12 hours |
| C2 | Over Write Prevention | Boolean | FALSE |
| ... | ... | ... | ... |

FIG. 6 Data Structure of Data Management Parameter Table

| UserID | Storage VolumeID | StartTime | EndTime | Parameter | Type | Value | Certificate |
|---|---|---|---|---|---|---|---|
| UsrA | SV_100 | Jul.7/05 3:05pm | (null) | Over Write Prevention | Boolean | TRUE | $&^^%(($# |
| UsrA | SV_100 | Jul.7/05 3:05pm | (null) | Preservation Term | Date | 6 Years | $&^^%(($# |
| UsrA | SV_100 | Jul.7/05 3:05pm | (null) | Remote Redundancy | Integer | 2 | $&^^%(($# |
| UsrA | SV_100 | Jul.7/05 3:05pm | (null) | Latency to the 1st byte | Date | 12 hours | $&^^%(($# |
| UsrA | SV_200 | Sep.1/05 9:15am | Jan.3/06 4:22pm | Over Write Prevention | Boolean | FALSE | #5^:^()@# |
| ... | ... | ... | ... | ... | ... | ... | ... |

FIG. 7 Data Structure of Data Management History Table

Field of your company

☒ Financial services
☐ Manufacturing
☐ Healthcare
☐ Communications
☐ Retail/wholesale
☐ Professional services
☐ Government

[Cancel] [Continue] [Help]

FIG. 8 User Interface for Regulation Target Field

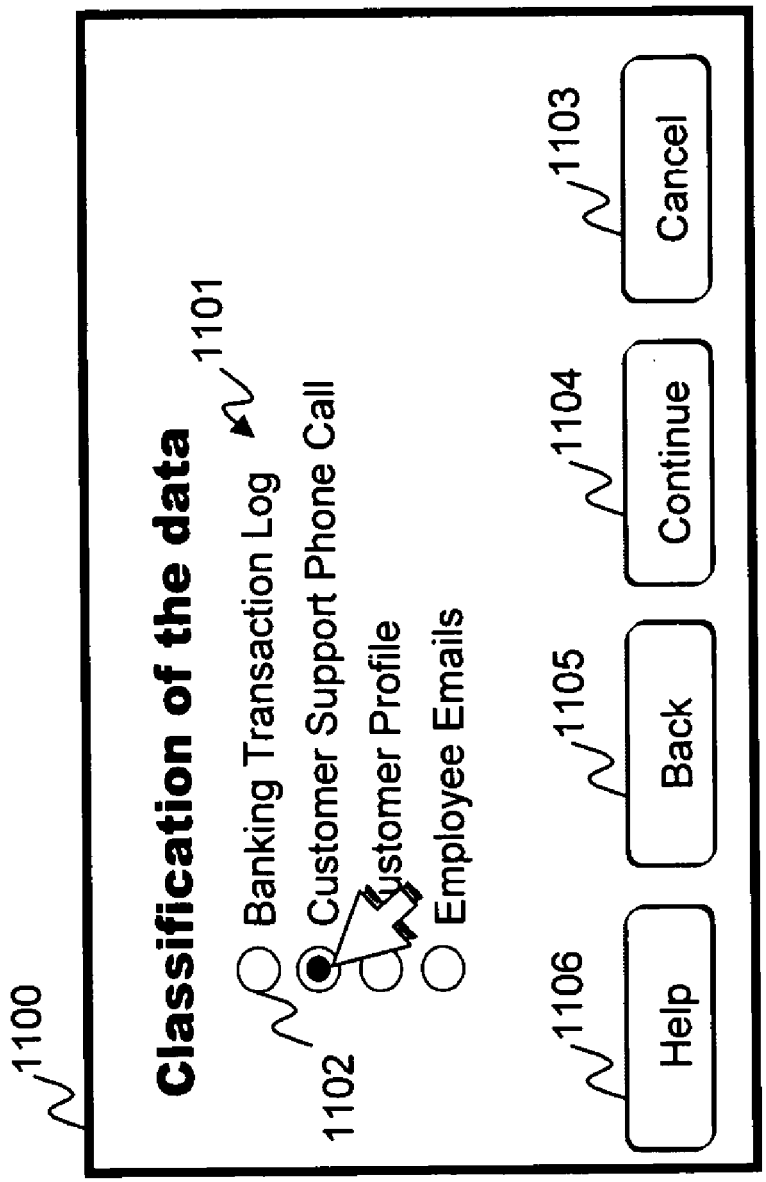
FIG. 9 User Interface for Data Classification

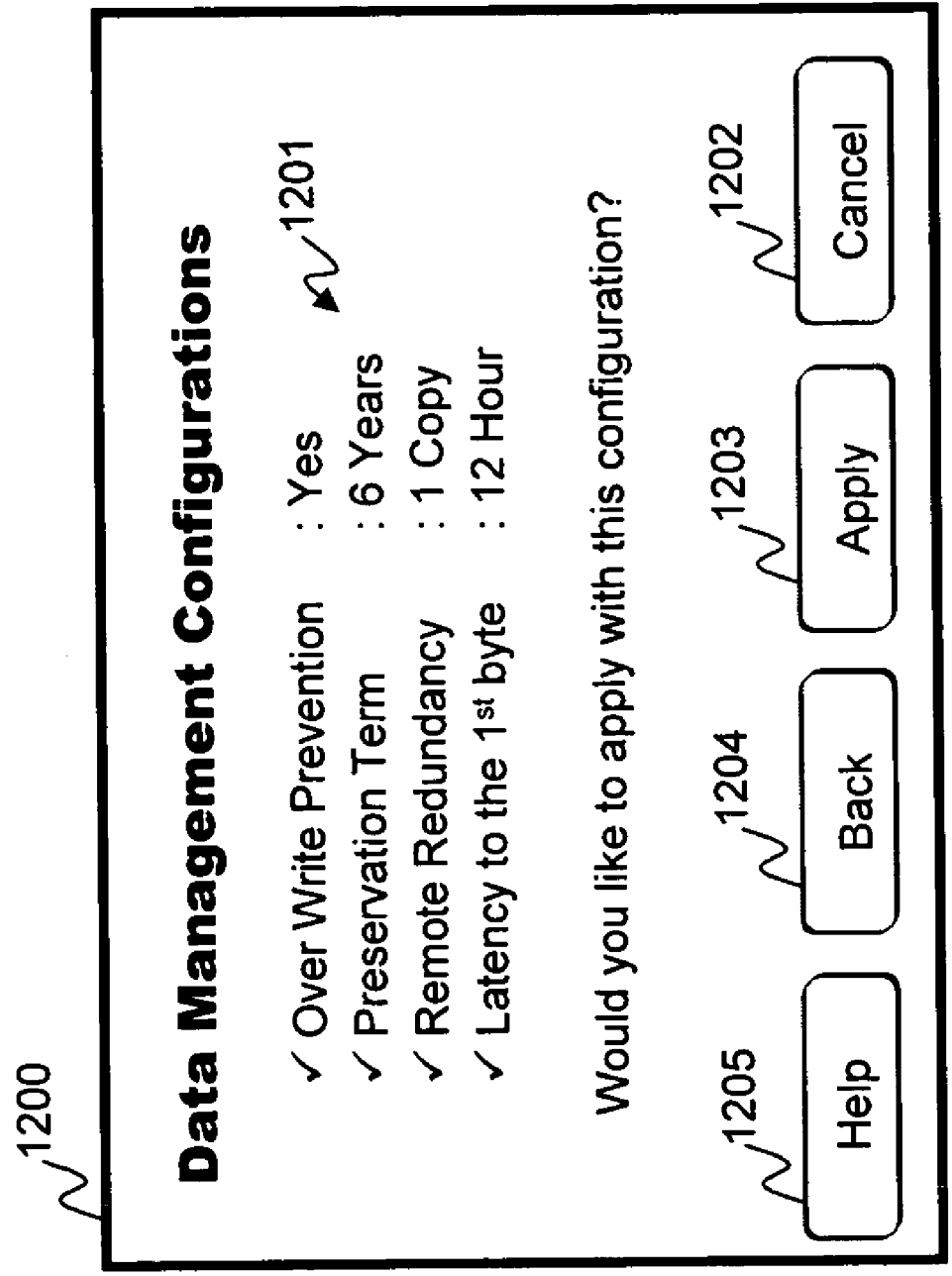
FIG. 10 User Interface for Data Management Configuration

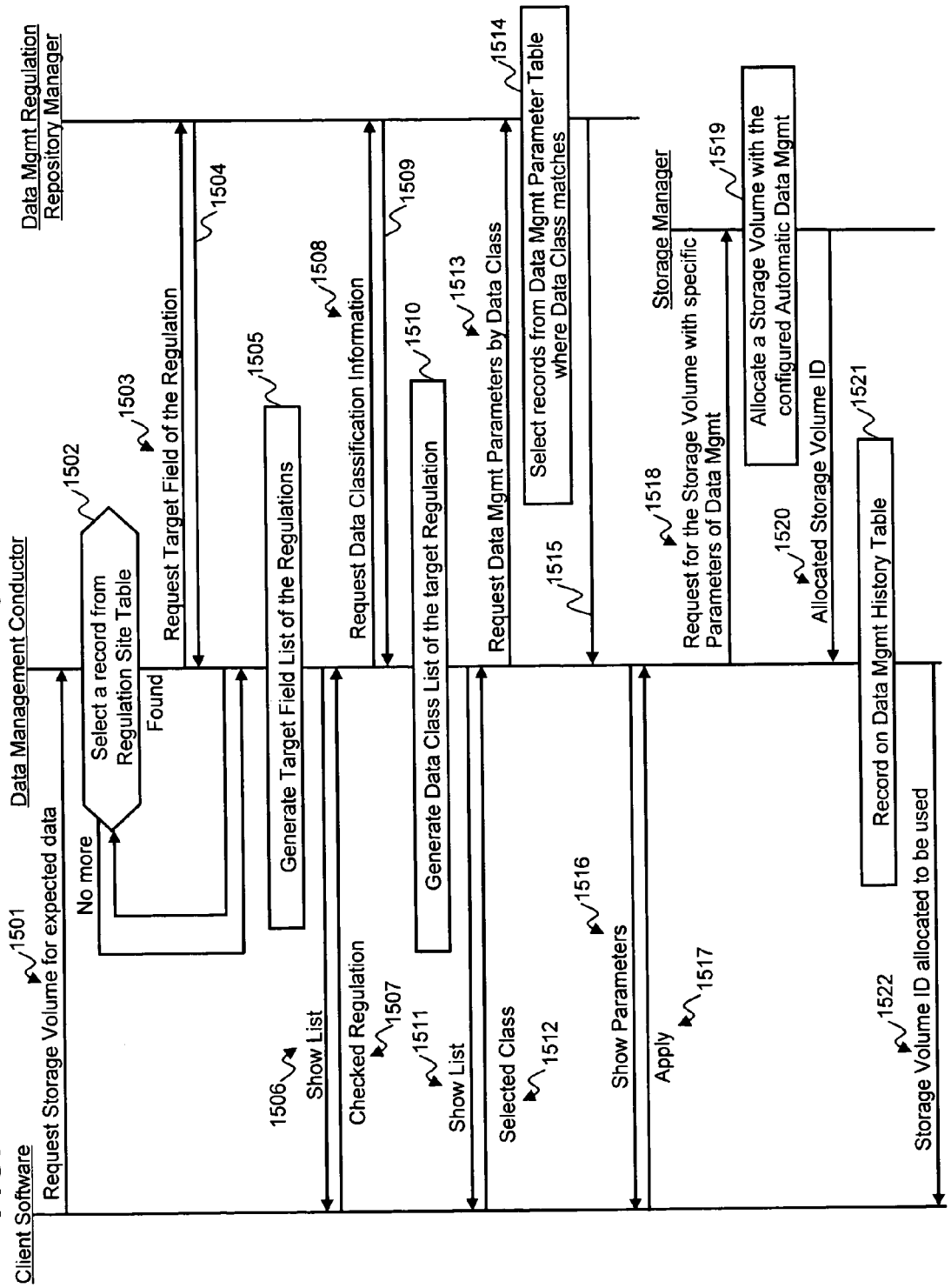
FIG. 11 Process of Data Classification and Allocating an Appropriately Managed Storage Volume

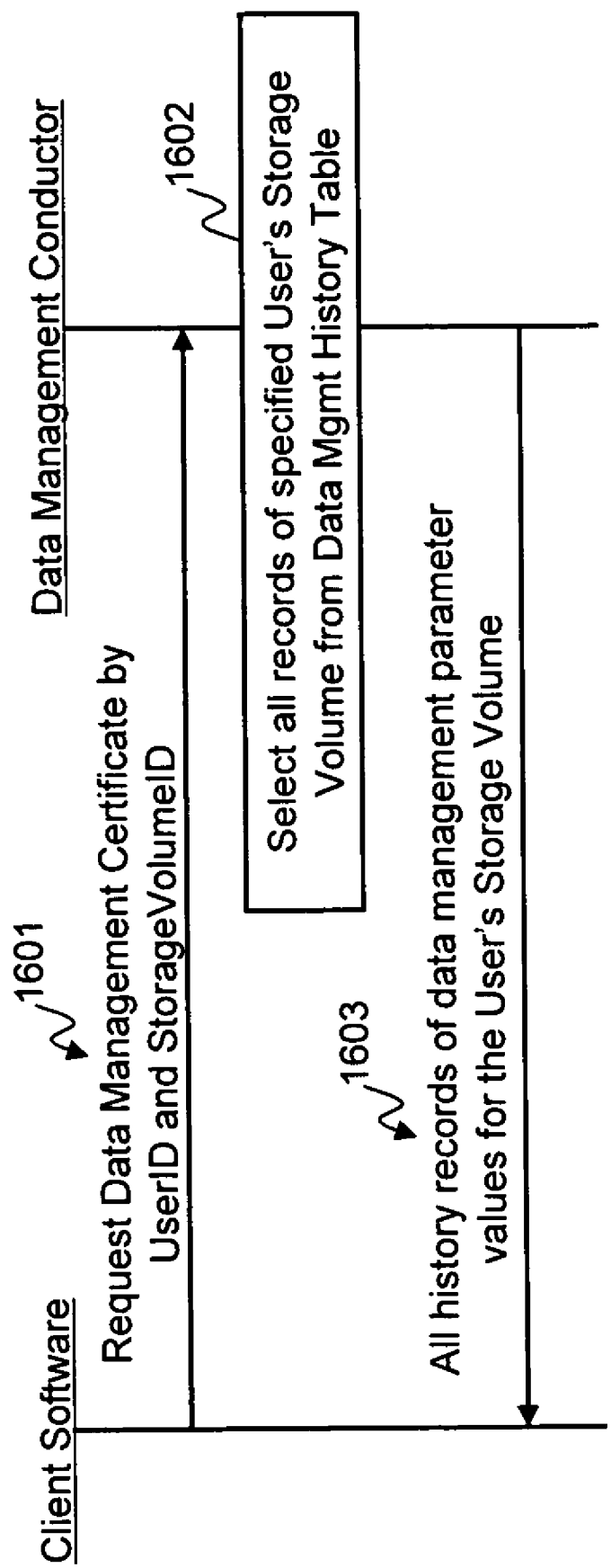
FIG. 12 Process of Issuing Data Management Certificate

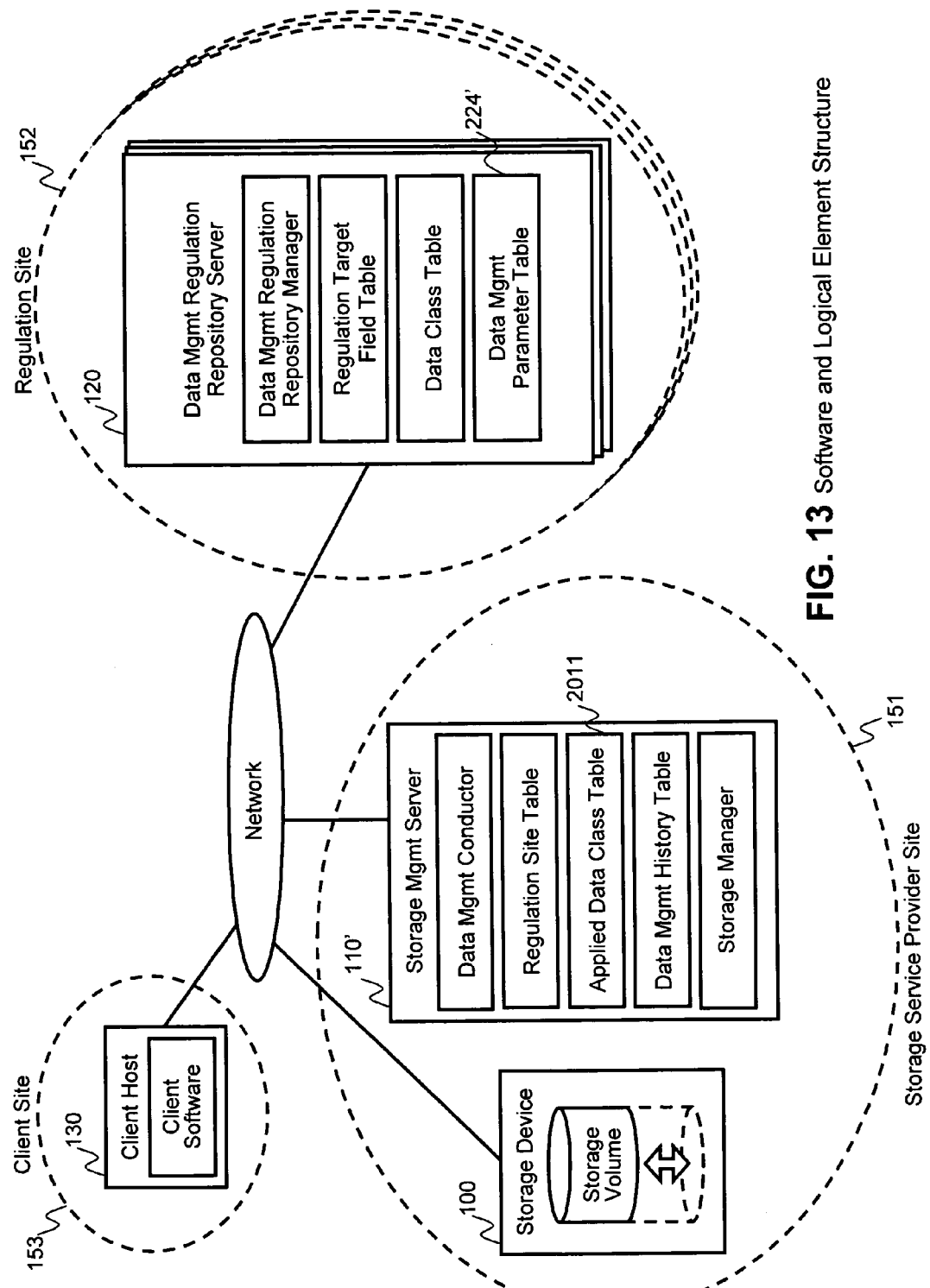
FIG. 13 Software and Logical Element Structure

| ClassID | Parameter | Type | Value | Safer |
|---|---|---|---|---|
| C1 | Over Write Prevention | Boolean | TRUE | TRUE |
| C1 | Preservation Term | Date | 6 Year | > |
| C1 | Remote Redundancy | Integer | 2 | > |
| C1 | Latency to the 1st byte | Date | 12 hour | < |
| C2 | Over Write Prevention | Boolean | FALSE | TRUE |
| ... | ... | ... | ... | ... |

FIG. 14 Data Structure of Data Management Parameter Table

| UserID | StorageVolumeID | RegulationID | ClassID |
|---|---|---|---|
| UsrA | SV_100 | FNC | C1 |
| UsrA | SV_100 | MFT | CA |
| UsrB | SV_500 | FNC | C3 |
| ... | ... | ... | ... |

FIG. 15 Data Structure of Applied Data Class Table

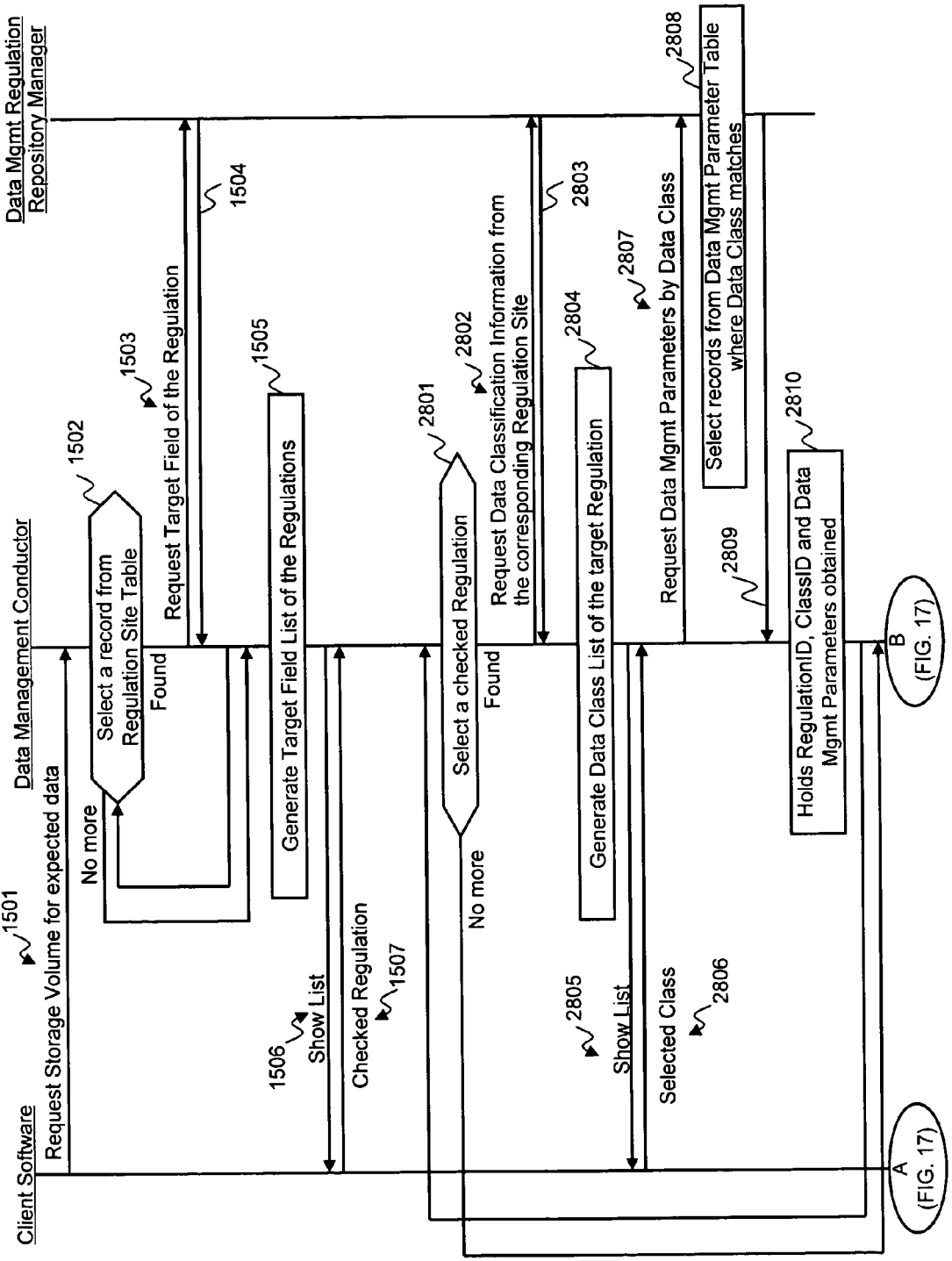
FIG. 16 Process of Data Classification and Allocating an Appropriately Managed Storage Volume

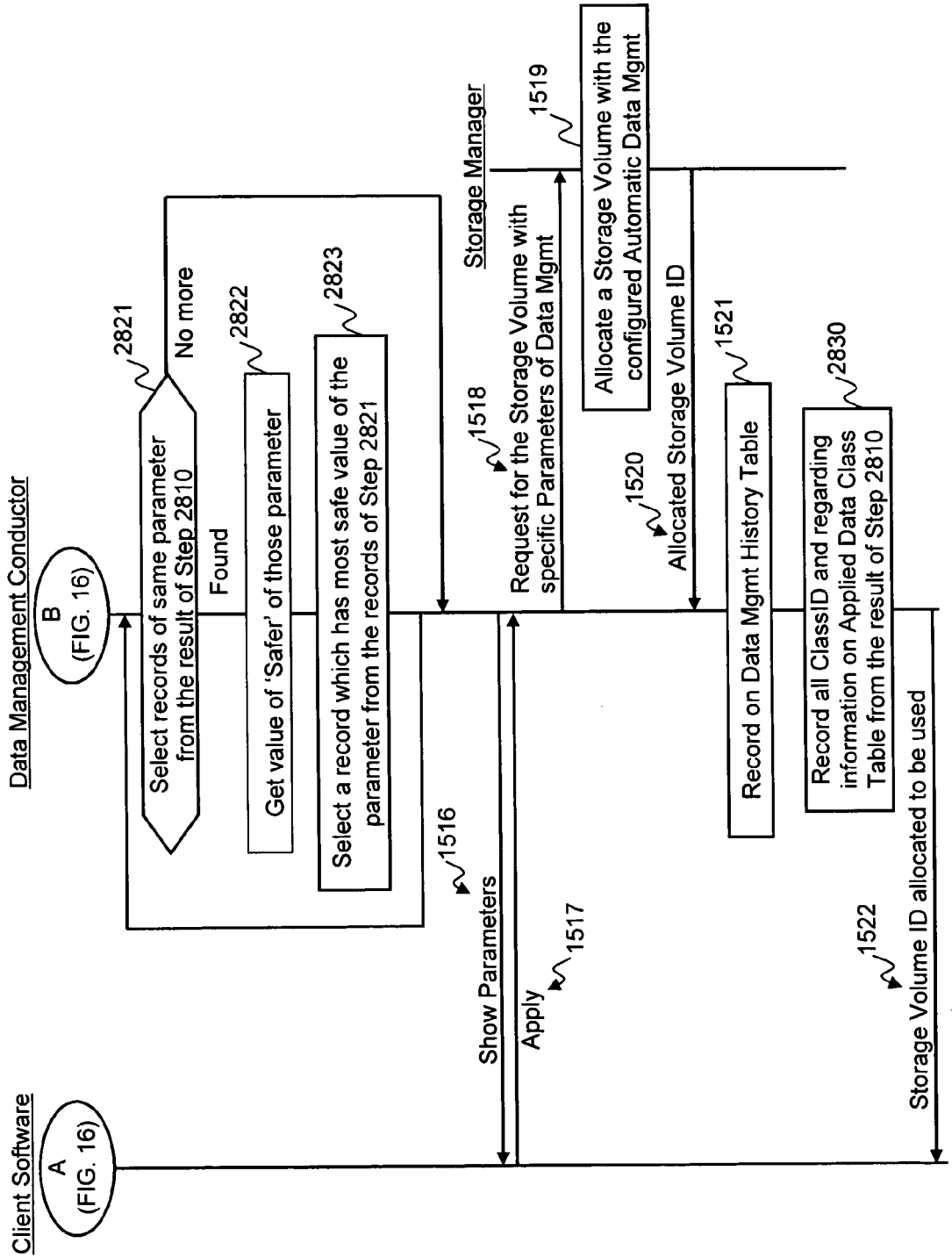
FIG. 17 Process of Data Classification and Allocating an Appropriately Managed Storage Volume (cont.)

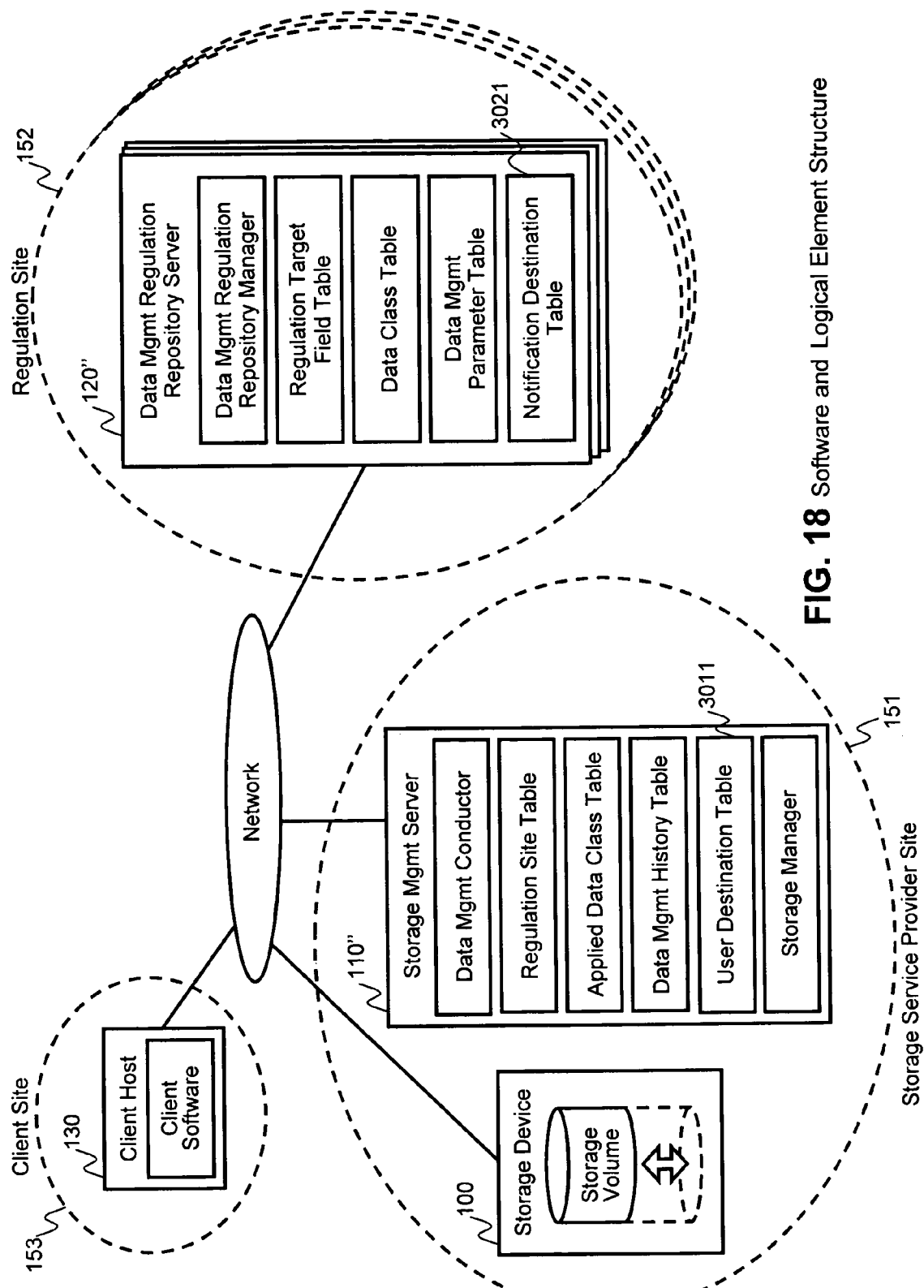
FIG. 18 Software and Logical Element Structure

| UserID | Destination | ... |
|---|---|---|
| UsrA | www.smba.com:xxxx | ... |
| UsrB | www.smbb.com:xxxx | ... |
| UsrC | www.smbc.com:xxxx | ... |
| ... | ... | ... |

FIG. 19 Data Structure of User Destination Table

FIG. 20 Data Structure of Notification Destination Table

| Destination |
|---|
| www.ssp100.com:xxxx |
| www.ssp200.com:xxxx |
| www.ssp300.com:xxxx |
| ... |

FIG. 21 Data Structure of Update Notification

| RegulationID | ClassID | Parameter | UpdateType |
|---|---|---|---|
| FNC | C1 | Preservation Term | Modified |

| Regulation Update Type | | Action |
|---|---|---|
| Regulation | Created | Notification Only |
| | Removed | Auto Migration |
| Data Class | Created | Notification Only |
| | Removed | Auto Migration |
| Data Mgmt Parameter | Created | Auto Migration |
| | Removed | Auto Migration |
| | Modified | Auto Migration |

FIG. 22 Map of Regulation Update and Data Migrating

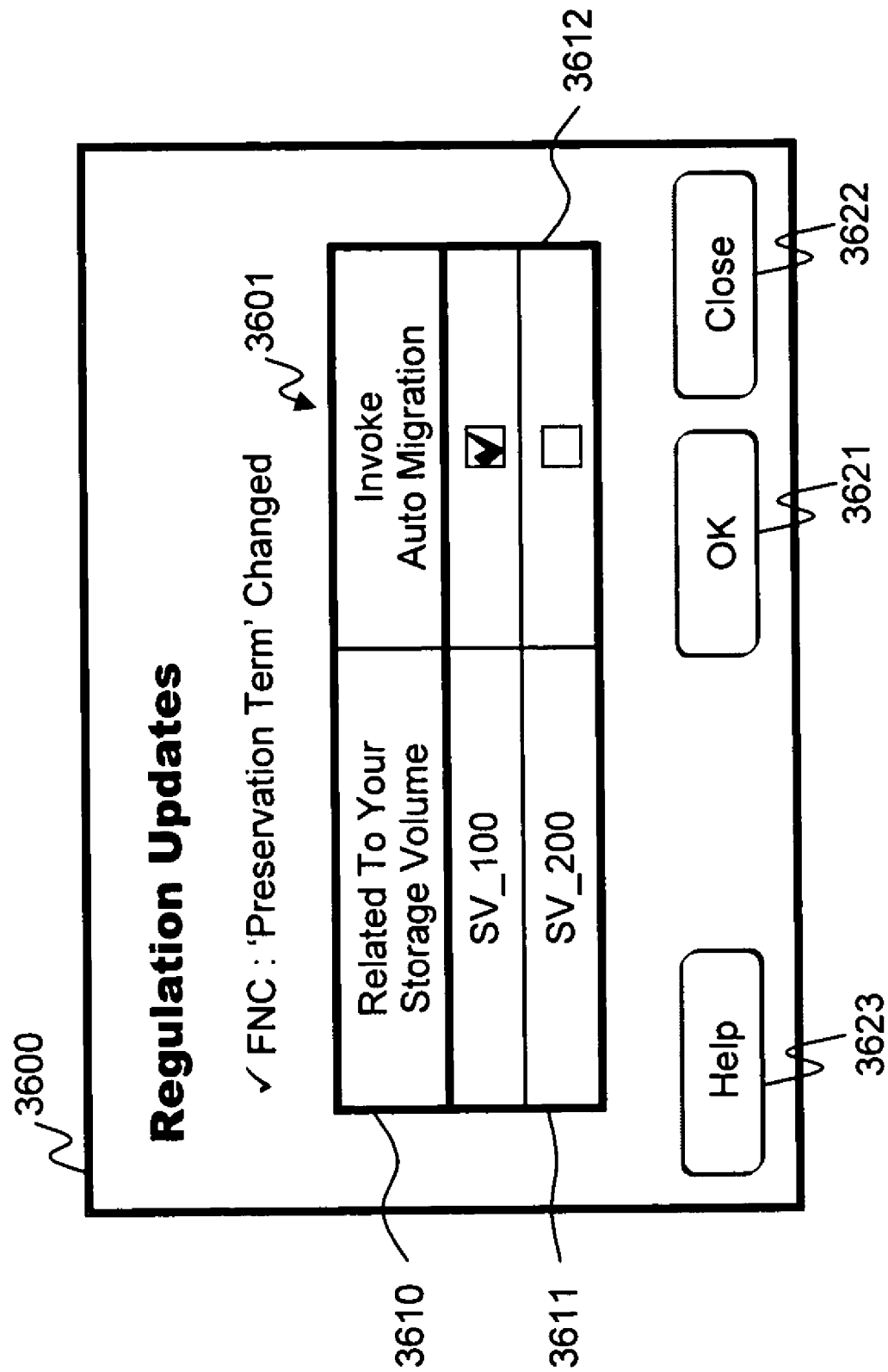
FIG. 23 User Interface for Regulation Changed Notification

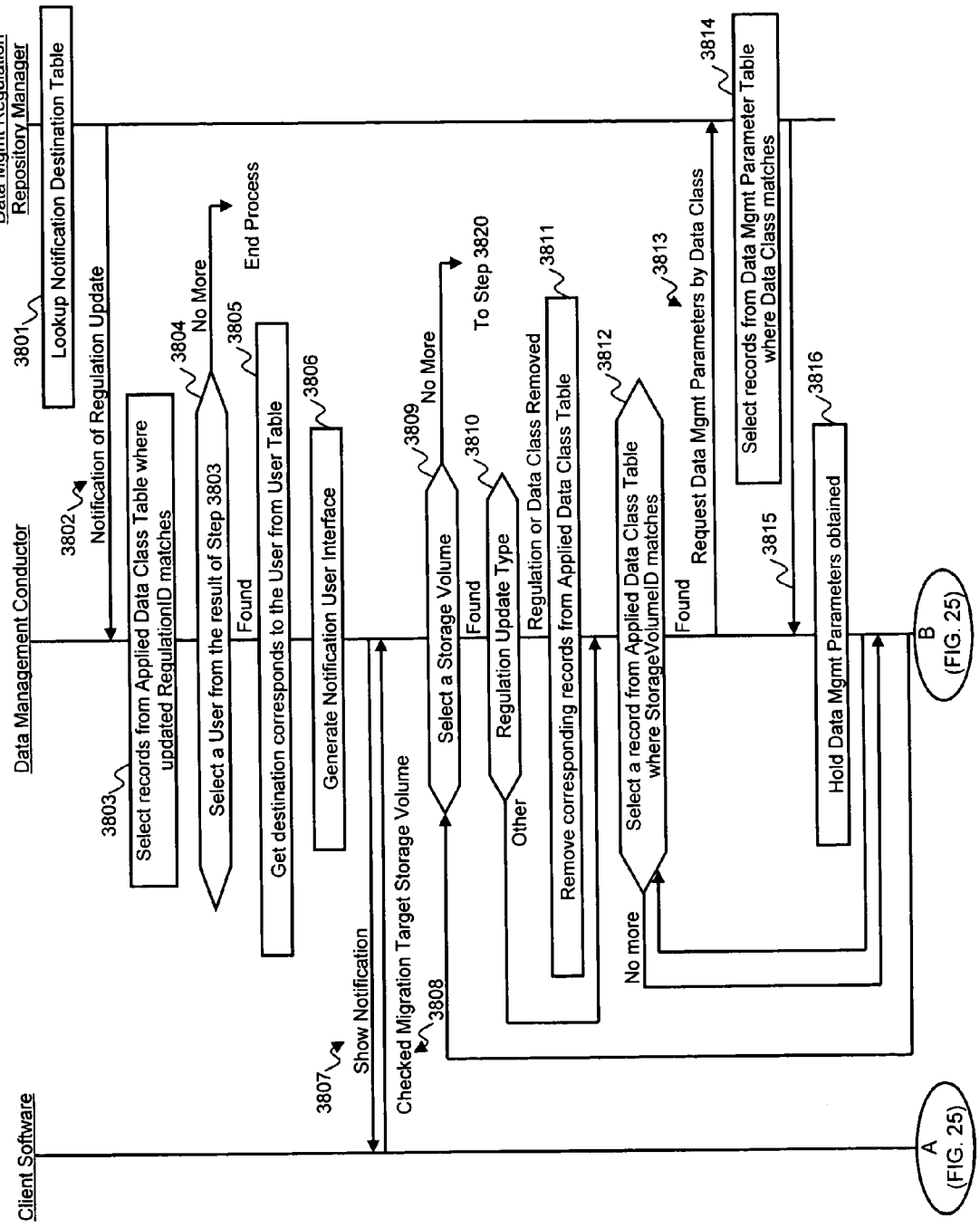
FIG. 24 Process of Regulation Change Notification and Auto Data Migration

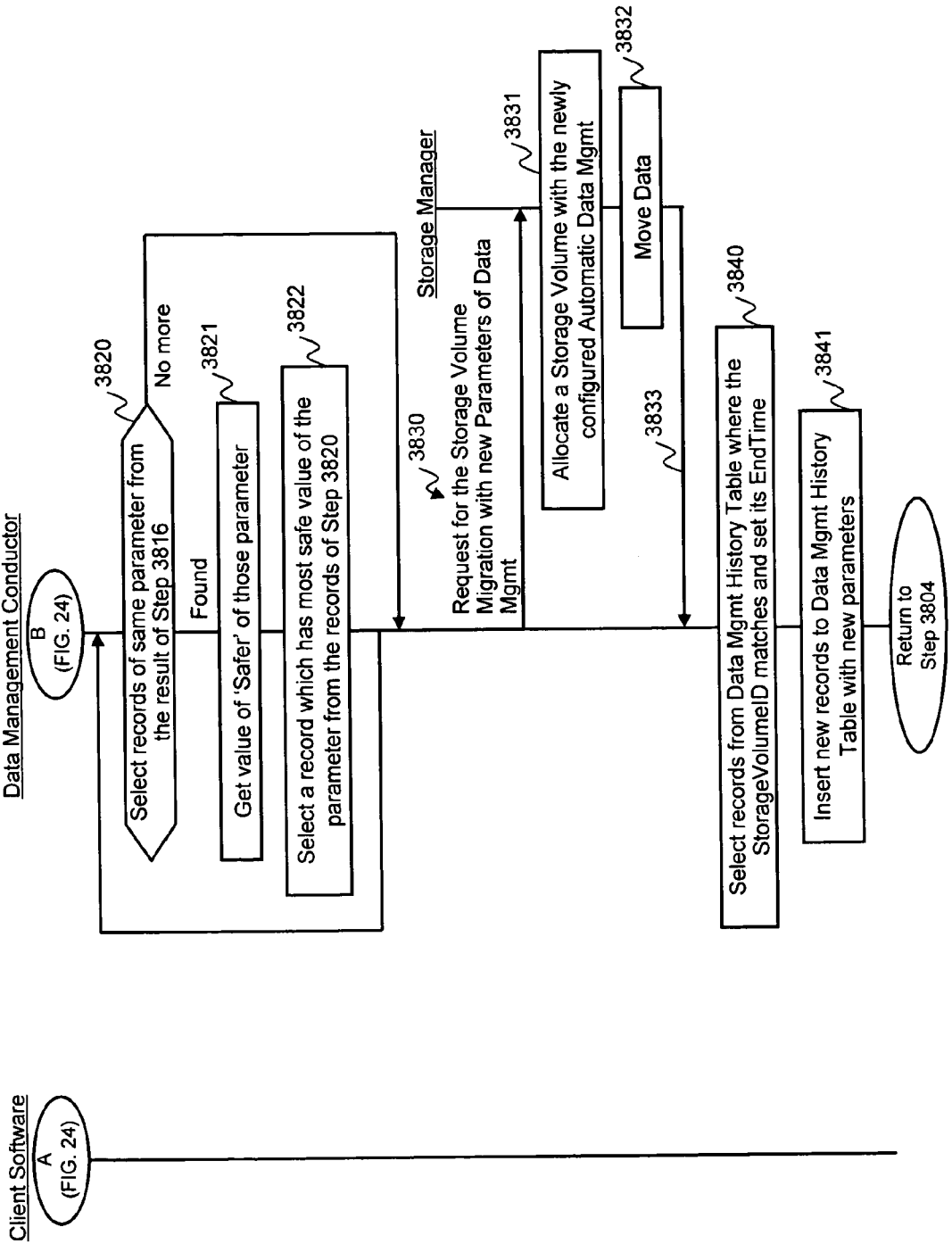
FIG. 25 Process of Regulation Change Notification and Auto Data Migration (cont.)

DATA MANAGED STORAGE SYSTEM FOR REGULATORY COMPLIANCE

BACKGROUND OF THE INVENTION

1. Field of the Invention

The present invention relates generally to storage of data, and, more particularly, to the automated management of data storage to ensure compliance with various mandatory data storage retention policies and regulations.

2. Description of Related Art

There are many small and middle-sized businesses (SMBs) that make use of data storage systems for storing business-related data. Even though these companies do not have large budgets or human resources to devote to storage of data, in a number of industries it is mandatory for them to be compliant with various laws, regulations and industry standards for the storage and retention of data. Examples of some such government regulations that require long-term data preservation include SEC Rule 17a-4, HIPAA (The Health Insurance Portability and Accountability Act), and SOX (The Sarbanes-Oxley Act). The data required to be preserved is sometimes referred to as "Fixed Content" or "Reference Information", which means that the data cannot be changed after it is stored for at least a predetermined retention period.

Large companies usually build necessary storage systems at their own data centers, and are able to afford sufficient training of storage administrators for managing their business data properly so as to comply with the regulations for their particular industry. However SMBs do not usually have the resources to spend similar amounts on storage systems and storage management personnel as large companies. Therefore, SMBs in some cases might not even be aware of how their respective business data should be managed to comply with the various regulations targeted to their business field, and even when they do understand what is required for compliance, SMBs may not have sufficient storage resources to meet the applicable regulatory requirements.

One solution for SMBs in this situation, rather than buying the storage equipment and training their own personnel, is to pay for a service whereby their respective business data will be appropriately managed by a storage service provider (SSP). The SSP owns and manages the actual storage equipment and employs expert storage management personnel that can manage the storage equipment and storage parameters to meet specified regulations and storage requirements for a particular industry. Generally such services cost less to a SMB than building its own storage system and hiring storage administration personnel.

However, an issue remains with this arrangement, since, because the SMB does not usually know details about how each form of data should be managed, the SMB cannot always order correct storage services specifically from the SSP. In such a case, the SMB needs to have some consultation with experts inside the SSP or with outside experts. However, such consulting fees can also pose a substantial cost for SMBs. Furthermore from a SSP's perspective there may be a large number of SMB companies, such that consulting individually with them on a one-by-one basis is not always a realistic way of determining the SMB's needs. Thus, it would be useful for both SMBs and SSPs to have an automated solution that directs a SMB user appropriately with regards to storage management requirements for data which is to be compliant to the related regulations for a particular industry.

There are known storage devices and solutions that enable a variety of types of data management for data storage and archiving for achieving regulatory compliance. For example, it is known to have storage arrangements implementing a WORM (Write Once Read Many) function that prevents over-writing of the data. These WORM systems may include a preservation function that retains the data for a specified period of time, and a shredding function that erases the data after the expiration of the retention period. Also, a remote copy arrangement may be required in some situations for copying data between datacenters located a long distance from each other to achieve compliance.

In addition, there are some services already implemented by SSPs that provide a user with specified characteristics for storage capacity or even remote copy service of the data. However, these do not solve the essential issue mentioned above, namely that the current solutions require knowledge for the setting of the actual parameters for the configuration of the storage systems, and many of the people at SMBs do not know or understand how to specify these parameters. Thus, there is no automated solution for determining which data class defined by a regulation corresponds to the user's data, and there is no automated solution for determining the actual parameters to be specified to the storage system for each data class. Also SMBs may need to prepare evidence of compliance that shows that their data was appropriately managed in case such evidence is required for auditing or inspection purposes. Thus, a need exists for an automated system for determining a user's storage requirements and for automatically setting parameters in the storage system to ensure compliance with the requirements.

BRIEF SUMMARY OF THE INVENTION

Under a first aspect, the present invention, provides an apparatus, system and method to manage business data properly according to related regulations, even if a storage service user does not know or understand the regulations very well.

Under an additional aspect, the present invention provides an apparatus, system and method for reducing consultation costs related to ensuring compliance with relevant regulations for data managed by SSPs.

Under an additional aspect, the present invention provides an apparatus, system and method for establishing evidence of compliant data management for use against auditing or inspection.

Under one embodiment, the data managed storage system disclosed in this invention includes one or more client hosts on one or more client sites, one or more storage devices and storage management servers on one or more SSP sites, and one or more data management regulation repository servers on one or more regulation sites. The storage management server has a means for a user to navigate data classification and a means for logging data management history for each service user. Data management regulation repository server maintains information such as target scope of one or more regulations, data classes defined in the regulations, and specific management parameters for each data class. The information provided to the client storage service user may include an explanation of the regulations and classes in general words that SMB users can easily understand. Upon receiving a request from a client host, the means on the storage management server gathers target field explanations of regulations from regulation sites, and then displays the information to the user for choosing the corresponding fields. According to the choice, the means on the storage management server requests data class information from the specific regulation site, displays a list of data classes to the user with their explanations, and allows the user to select one of these that apply. With these two processes, users will be able to identify a defined class on a regulation which matches their data storage needs.

The means on the storage management server then requests actual data management parameters from the regulation site by specifying the data class derived by the user's navigation, and then requests a managed storage volume according to the obtained parameters from another means on the storage management server which provides general storage capacity provisioning and data management functionality. A record of the user data's management configuration is stored, and this record may be retrieved by the user for use as a certificate of appropriate data management.

These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 1 illustrates an example of a physical hardware architecture of a first embodiment of the invention.

FIG. 2 illustrates a software and logical element structure of the embodiment of FIG. 1.

FIG. 3 illustrates a data structure of a regulation site table.

FIG. 4 illustrates a data structure of a regulation target field table.

FIG. 5 illustrates a data structure of a data class table.

FIG. 6 illustrates a data structure of a data management parameter table.

FIG. 7 illustrates a data structure of a data management history table.

FIG. 8 illustrates a user interface for selecting a regulation target field.

FIG. 9 illustrates a user interface for selecting a data classification.

FIG. 10 illustrates a user interface for applying a data management configuration.

FIG. 11 illustrates a process of data classification and allocating an appropriately managed storage volume.

FIG. 12 illustrates a process of issuing a data management certificate.

FIG. 13 illustrates a software and logical element structure of the second embodiment.

FIG. 14 illustrates a data structure of a data management parameter table for use with the second embodiment.

FIG. 15 illustrates a data structure of an applied data class table.

FIG. 16 illustrates a process of data classification and allocating an appropriately managed storage volume for the second embodiment.

FIG. 17 illustrates additional steps in the process of data classification and allocating an appropriately managed storage volume of FIG. 16.

FIG. 18 illustrates a software and logical element structure for a third embodiment of the invention.

FIG. 19 illustrates a data structure of a user destination table.

FIG. 20 illustrates a data structure of notification destination table.

FIG. 21 illustrates a data structure of an update notification.

FIG. 22 illustrates a map of regulation update and data migrating.

FIG. 23 illustrates a user interface for regulation change notification.

FIG. 24 illustrates a process of regulation change notification and auto data migration.

FIG. 25 illustrates a continuation of the process of regulation change notification and auto data migration of FIG. 24.

DETAILED DESCRIPTION OF THE INVENTION

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any fashion.

First Embodiment—Hardware Architecture

FIG. 1 illustrates an example of physical hardware architecture of a first embodiment of the invention. The overall system consists of one or more storage devices 100, a storage management server 110, a data management regulation repository server 120, and a client host 130. These are connected through a network 140, which may be an intermix of a fiber channel (FC) network and an internet protocol (IP) network or other known network protocol combinations. Storage device 100 and storage management server 110 reside at a storage service provider (SSP) site 151 which is the datacenter of the SSP. Data management regulation repository server 120 resides at regulation site 152. There may be one or many regulation sites 152 and/or multiple repository servers 120, each providing a repository of their own regulations, and these may be located at the same site, or at separate sites. Client host 130 resides at a client site 153 which is the location of the user of the storage service provided by the SSP, and which may be, for example, a SMB company. There may, of course, be any number of different client sites and users and multiple SSP sites.

Storage device 100 comprises a controller 101 and a storage medium 104. A port 102 and a network interface card (NIC) 103 may be provided within the controller 101. Storage medium 104 could be variety of devices such as hard disks, flash memory, optical disks, tape, and the like. Storage mediums 104 are connected to the controller 101 via bus, FC connection, or the like. Storage device 100 provides capacity for data storage, and may be designated especially for data archiving in this invention, and could be one or more separate storage units including a variety of different types of storage mediums 104.

Storage management server 110 is a computer server that may include among its components a CPU 111, a memory 112, and a NIC 113. Storage management server 110 includes a means for allocating specific storage capacity for particular users and means for management of stored data. Also, under the invention, as will be described in more detail below, storage management server 110 includes a navigation means for enabling storage service users to classify their data through inquiries, and a means for retaining evidence of appropriate data management of each user.

Data management regulation repository server 120 may be a computer server that includes among its components a CPU 121, a memory 122, and a NIC 123. Regulation repository server may be owned and managed by an agency of the government or other organization that manages or propagates business data management regulations. Thus, each regulation propagating organization may build their own regulation site 152 to provide the latest information regarding regulations for a particular industry for which it has oversight. Each regulation site 152 serves information relating to regulations for a target field or industry, and also serves information for determining a class of data for which a company produces or is responsible.

Client host 130 may be a computer that includes a CPU 131, a memory 132 and a NIC 133. Host 130 may be a terminal computer for the storage service user (i.e., the users at a SMB) and is used by the users to order from the SSP some amount of storage capacity for storing an expected amount of data within a storage scheme that is compliant with regulatory requirements. Client host 130 may or may not also be a terminal computer that is used to actually access and read/write data to a requested storage volume on storage device 100.

Software and Logical Element Structure

FIG. 2 illustrates a software and logical element structure of the first embodiment of the invention. On storage device 100, one or more logical storage volumes 201 are allocated for a user to provide data storage capacity for the user. Storage volume 201 may be provided to the user using one or a variety of the types of storage media 104 mentioned above. Capacity size is logically built by several storage mediums, and is not restricted to the size of a single storage medium. Further, storage volume 201 may include a function of flexibly expanding and contracting its size based upon demand for storage capacity. Thus the size of storage volume 201 can be changed automatically by just "using" the capacity. For example, a logical volume 201 may be created using a plurality of hard disk drives as storage media 104, and more disk drives may be allocated to the volume as storage capacity demand increases, or if a user does not require all the capacity allocated, disk drives may be reallocated to other users. Thus, storage volume 201 indicates a general capacity of storage, and is not meant to restrict the storage capacity to any specific level. Further, it should be apparent that any number of storage volumes 201 may be allocated to one user or to different users, and that the size and number of possible volumes is limited in actuality by the overall storage capacity of the storage devices 100.

On the storage management server 110 a data management conductor 211 is a software program of the invention that acts to classify expected data of a service user, and that provides instructions for obtaining appropriate characteristics and parameters for managing storage volume 201 with necessary data management that satisfies the related regulations. Data management conductor 211 is also able to provide a certificate of appropriate data management for each user. Data management conductor 211 may be stored in memory 112 on storage management server, or on other computer readable medium at SSP site 151 or in a remote location.

A regulation site table 212 is readable by data management conductor 211, and contains the locations of each data management regulation repository server 120 at regulation sites 152. Additionally, a data management history table 213 contains records of each user's data management configuration history. This may be retrieved by the service user when the service user needs to provide evidence of appropriate data management compliance with laws and regulations during auditing or inspection.

Further, a storage manager 214 is a program executable on the storage management server 110 to provide allocation of desired characteristics and parameters to each storage volume 201, and to also provide a desired automated data management such as use of WORM media, preserving data for a particular retention period, providing remote copying functions, and the like. Thus, storage manager 214 provides storage capacity and data management by specifying the actual parameters of volume characteristics and a particular data management method for a volume 201.

On the data management regulation repository server 120 is a data management regulation repository manager 221, which is a program to serve information regarding regulations for specific data management according the regulations propagated by the agency that manages the repository server 120. Data management regulation repository manager 221 may be stored in memory 122 on storage management server, or on other computer readable medium at regulation site 152 or in a remote location. A regulation target field table 222 holds descriptions for describing the target scope of the regulations. A data class table 223 holds a list of data class definitions regarding the regulations. The classification for a particular user may be defined by the distinction of the data management method. Additionally, a data management parameter table 224 contains actual data management parameters which are specified to the storage manager 214 on the storage management server 110. Data management parameter table 224 includes parameters associated with respective data classes so that a necessary set of parameters may be retrieved from the table for the particular data class specified for a particular user. These tables will be discussed in more detail below. Further, the storing and updating of each record of the tables discussed above may be managed by a DBMS (database management system), a text file editor, or managed by data management regulation repository manager 221.

On the client host 130 there is included client software 231, which is a program capable of ordering a desired storage volume 201 from the SSP, and for interfacing with the SSP, as will be described in more detail below. This storage volume 201 is automatically managed under the invention so as to be in compliance with the related regulations and storage procedures for the particular business of the particular service user. Client software 231 may be software specifically designed for use with the SSP, or could be more general software, such as a web browser or other general interface capable of displaying a graphic user interface.

Regulation Site Table

FIG. 3 illustrates an exemplary data structure of the regulation site table 212. Regulation site table 212 includes the following fields:

Regulation ID 510: Identifies the regulation repository server 120 at a regulation site 152 applicable to a particular set of regulations.

Location 520: includes location information such as a URL (uniform resource locator) to specify a regulation repository server 120 applicable to a particular regulation. For instance, line 591 represents a record of a regulation repository server which its regulationID is "FNC" and the location 520 of the server 120 is "www.fncdma.org/repository/", which is the URL for server 120 having FNC regulation information. Similarly, line 592 represents a record of a regulation repository server 120 whose regulationID is "MFT" and the location 520 of server 120 is "www.mftdma.org/repository/", which is the URL for a server 120 having MFT regulation information. The regulation site table 212 is referred to by data management conductor 211 to find each regulation repository server 120.

Regulation Target Field Table

FIG. 4 illustrates an exemplary data structure of regulation target field table 222. Regulation target field table 222 includes the following fields:

Regulation ID 610: Identifies a particular regulation.

Description 620: Provides a description of the target field or industry generally related to the regulation. For instance, line 691 represents that the RegulationId 610 is "FNC" and its Description 620 is specified as "Financial Services". The content of the description 620 is an explanation of the scope of the regulation in general terms that a SMB user will be able to easily understand. The regulation target field table 222 is referred to by data management regulation repository manager 221 as requested by data management conductor 221 of SSP site 151.

Data Class Table

FIG. 5 illustrates an exemplary data structure of data class table 223. Data class table 223 includes the following fields:

Class ID 710: Identifies a data class for a particular data type.

Description 720: Describes the data type in general terms that a SMB user will be able to easily understand. For instance, line 791 represents a record of a data class having a classID of "C1", and "Banking Transaction Log" is the corresponding description of the data type of class "C1". Similarly, line 792 represents a record of a data class having a classID of class "C2", and "Customer Support Phone Call" is the description of the data type of class "C2". Data class table 223 is referred to by data management regulation repository manager 221 as requested by data management conductor 211 of SSP site 151.

Data Management Parameter Table

FIG. 6 illustrates an exemplary data structure of data management parameter table 224. Data management parameter table 224 includes the following fields:

Class ID 810: Identifies a data class.

Parameter 820: Name or identification of a storage management parameter applied in the identified data class.

Type 830: Data type of the parameter.

Value 840: Value of the parameter to be specified for the identified data class. For instance, line 891 represents a record of a data management parameter that is one of the parameters for the data class "C1" and that specifies that "Over Write Prevention" is required for this class. Thus, for this class, overwrite prevention will be specified as "TRUE" which is a Boolean data type, and this specifies that for data class C1, data is protected from being over-written after the data is stored to the storage device 100. Similarly, line 892 is another parameter for class "C1" that shows "Preservation Term" for this class will be "6 Years". Table 224 will typically have several records for the particular data class, each controlling a particular data storage parameter. This structure allows the flexibility of adding new type of parameter to the table 224 should the parameters for a particular data class change or be augmented. Data management parameter table 224 is referred to by data management regulation repository manager 221 as requested by data management conductor 211 of SSP site 151.

Data Management History Table

FIG. 7 illustrates a data structure of data management history table 213. Data management history table 213 includes the following fields:

UserID 910: Identifies the user who ordered the storage capacity.

Storage Volume ID 920: Identifies the storage volume 201 that is allocated to the user identified by the userID 910.

StartTime 930: Identifies the date and time at which the specific data management for this storage volume was started.

EndTime 940: Identifies the date and time at which the specific data management for this storage volume ended. The endTime could be a null value during the time period in which the storage volume is still being managed by this parameter, as shown in lines 991-994, which indicate that no end time is specified, while line 995, on the other hand, indicates an endTime of Jan. 3, 2006.

Parameter 950: The name or identification of the specific storage management parameter.

Type 960: Data type of the storage parameter.

Value 970: Value of the storage parameter that is specified.

Certificate 980: A binary data of a certificate of compliance with the Regulation.

For instance, line 991 represents a record of data management configuration that is specified to the storage system 100 for the particular data which belongs to "UsrA" that is stored in storage volume 201 having a storage volumeID of "SV_100". Line 991 indicates that the management was started "Jul. 7th of 2005 at 3:05 pm", and that the system is still managing that data using the same parameter value. Certificate 980 may be binary data produced by data management regulation repository manager 221 which certifies that the data management parameter value was retrieved from a formal regulation site 152. The certificate may be generated by the identification of the specific regulation and any revision number of the regulation. Similarly, line 995 shows an example in which the management with this parameter has already ended. Data management history table 213 contains every history of specified data management parameters for every user's respective storage volume 201 so that multiple records for every period may be stored. Further, the term storage volume used here indicates a general capacity of storage, and is not intended to be restricted to a specific level of storage amount. Data management history table 213 is referred to by data management conductor 211 to provide a certificate of correct data management for each service user's data, if requested by the service user.

User Interface

FIG. 8 illustrates an exemplary user interface 1000 for determining a regulation target field, and which is preferably generated by data management conductor 211 and displayed on the client software 231. Available target field descriptions 1001 are retrieved regarding respective available regulation repository servers 120 and listed on the display. Storage service user will determine the field that corresponds most closely to the user's business from the displayed list. The description displayed here is preferably an explanation of the scope of each regulation in general terms that a SMB user will be able to easily understand. FIG. 8 shows names of business fields as just an example, and other more detailed information or alternative information may be provided, depending on the nature of the service user's business. Check boxes 1002 are shown beside each field description, and the user will check on the one most relevant to the user's business. In this embodiment, it is assumed a user will select only one item on the list.

A cancel button 1003 may be used to quit this process of ordering the storage service. A continue button 1004 may be used to proceed to the next step of ordering the storage service. This will cause the program to proceed to the screen display to select data classification, as described below. A help button 1005 is also provided to assist the user, should the user have questions about the field descriptions or other questions.

FIG. 9 illustrates an example of a user interface for data classification which is generated by data management conductor 211 and displayed on the client software 231. Data class descriptions 1101 are retrieved from the target regulation repository which was selected by the user and listed for user so that the user is able to select the data class description that best applies to the user's business. For instance, FIG. 9 shows example data class descriptions 1101 related to the particular financial service regulation selected in FIG. 8. Similarly, specifically-tailored data class descriptions 1101 can be provided for each of the regulation fields 1001 listed in FIG. 8. The storage service user determines from this data classification list which data classification to order for the capacity and management of the data.

A cancel button 1103 is provided should the user desire to quit this process of ordering the storage service. A continue button 1104 is provided to enable the user to proceed to the next step of ordering to confirm the data management parameters once a selection has been made for data classification. A back button 1105 enables the user to return the process back to the screen of the regulation target field 1000. A help button 1106 is provided to assist the user, should the user have questions about the classification of data, or other questions.

FIG. 10 illustrates an exemplary user interface display for data management configuration which is generated by data management conductor 211 and displayed on the client software 231. The appropriate data management parameters and their values 1201 are retrieved from a target regulation repository site 152 following the user's selection of a particular data class using the display of FIG. 9. In FIG. 10, the data management parameters and their values are presented to the user so that the user can consider and confirm the parameters that will be used to manage the user's data. Thus, even though the service user may not know about the related regulations for classifying and managing their data, under the invention the appropriate regulations are determined and the correct data management parameters are set to ensure compliance with the regulations. Other possible configurations for data management that may be displayed on this screen may include: a data shredding method, a security method, migration control, a price of a selected service by GB per month, or the like.

A cancel button 1202 is provided should the user desire to quit the process of ordering the storage service without applying. An apply button 1203 is provided to enable the user to proceed with the displayed parameters to send a request for a storage volume and its data management to the storage manager 214. A back button 1204 is provided to enable the user to return the process back to the screen of data classification 1100. A help button 1205 is provided to assist the user, should the user have questions about the data management configuration or other questions.

Thus, it may be seen that the user interfaces described above provide a navigation means for users to properly classify their data for storage in compliance with obligatory regulations and requirements. Further, this may be accomplished by a user with little or no knowledge of the regulation itself, since the data management conductor uses the user interface to determine the proper storage parameters for the user by gathering information about the user's business.

Process for Data Classification and Allocating an Appropriately Managed Storage Volume FIG. 11 illustrates an exemplary process of data classification and allocating an appropriately-managed storage volume between requester client software 231, service provider data management conductor 211 and information provider data management regulation repository manager 221 of respective regulations. The process may be carried out as follows:

Step 1501: Client software 231 sends a request (order) for a new storage volume 201 to the data management conductor 211 at SSP site 151.

Step 1502: Data management conductor 211 selects a record from regulation site table 212. Additional records may be selected until all relevant records are selected. Once no additional records are found, then the process proceeds to step 1505.

Step 1503: For each relevant record located, the process sends a request of target field of the regulation to the appropriate data management regulation repository manager 221 specified as the location on the selected record.

Step 1504: The target field description of the regulation is returned from the data management regulation repository manager 221 to the data management conductor 211 and the process proceeds back to step 1502 again for the next regulation.

Step 1505: Data management conductor then generates a screen with a list of gathered target field descriptions (i.e., regulation target fields 1000).

Step 1506: The screen 1000 of FIG. 8 is displayed on the client software 231.

Step 1507: The user selects a corresponding field of regulations on the list 1001 and that selection is returned to the data management conductor 211.

Step 1508: The process then requests data classification information from the appropriate regulation repository manager 221 of the selected regulation.

Step 1509: The regulation repository manager 221 returns a set of information about data classification which is the data that the data class table 223 contains.

Step 1510: Data management conductor 211 generates a screen with a list of obtained data class descriptions (i.e., data classification) as illustrated in FIG. 9 by display interface 1100.

Step 1511: User interface display 1100 is displayed on a screen on the client software 231 to enable the user to select a data classification.

Step 1512: The user selects a data class which corresponds to the data to be managed at the SSP, and the selected class is returned to the data management conductor 211.

Step 1513: The process requests actual data management parameters from the regulation repository manager 221 by specifying the data class selected by the user.

Step 1514: Regulation repository manager 221 selects records from data management parameter table 224 where the selected data class is matched to the specified class and each parameter for that class.

Step 1515: Regulation repository manager 221 returns a set of parameters to the data management conductor 211.

Step 1516: With the obtained data management parameters, data management conductor 211 generates a screen for displaying to the user the parameters under which the user's data will be managed.

Step 1517: The screen is displayed as data management configurations 1201 on the user interface 1200, and the user uses the apply button 1203 to apply for storage using the displayed management parameters.

Step 1518: With the obtained data management parameters, data management conductor 211 sends a request for the new storage volume 201 with those management parameters to the storage manager 214.

Step 1519: According to the specified parameters, storage manager 214 creates a storage volume having the specified characteristics and storage parameters, and setups the configuration for automatic data management of the volume 201.

Step 1520: Storage manager 214 sends back identification information regarding the newly-created storage volume 201 to the data management conductor 211.

Step 1521: Data management conductor 211 records a log for beginning data management of that storage volume 201 to the data management history table 213.

Step 1522: Data management conductor 211 then sends the storage volume ID to the client software 231 as the result of requested storage capacity which will be appropriately managed according to the relevant regulations.

Process for Issuing a Data Management Certificate

FIG. 12 illustrates an exemplary process of issuing a data management certificate from data management conductor 211 to the client software 231 (user). The steps of the process are as follows:

Step 1601: Client software 231 sends request for a data management certificate for the particular user's storage volume 201 to the data management conductor 211 with userID and storageVolumeID in order to obtain a certificate that indicates that the data has been properly managed as defined in the relevant regulations.

Step 1602: Data management conductor 211 selects all records regarding the user's specified storage volume from data management history table 213. Those records contain the entire history of data management for the specified volume with sequential periods of time and respective management parameters and the parameter values (i.e., the data management settings).

Step 1603: Data management conductor 211 returns the retrieved records to the client software 231. Format of the returned records may be in any of a variety of format types such as XML, a standardized graphic certificate, or the like.

Second Embodiment

The second embodiment of the invention sets forth an example in the case wherein a service user is required to meet the requirements of several different regulations. In this case the user will check several items 1001 on the user interface of regulation target field 1000. Most of the components and functions of the invention are the same as described above with respect to the first embodiment. Accordingly, only the differences are discussed below.

Software and Logical Element Structure

In this second embodiment, as illustrated in FIG. 13, one additional table, an applied data class table 2011, is placed on the storage management server 110'. Other software and logical element structure is same as shown in FIG. 2 in the first embodiment. The applied data class table 2011 contains records indicating an applied data class against each user's respective storage volume.

Data Management Parameter Table

In addition, as illustrated in FIG. 14 data management parameter table 224' is modified over the first embodiment. Most of columns of data management parameter table 224' are the same as for table 224 of FIG. 6, but a new column is added on this embodiment. Safer column 2550 contains the "safer" value of the parameter when there are two regulations that specify the same parameter, but different values for that parameter. The "safer" value is determined from the standpoint of providing greater data protection when necessary. In other words, safer column 2550 is used to select a single value for a parameter to resolve a parameter conflict when there are two or more specifications for the parameter, such as for several selections of different data classes. For example, line 2591 represents a record of a data management parameter of "Over Write Prevention" for a data class "C1" in which the value is "True", while line 2595 represents a data management parameter for "Over Write Prevention" for a data class "C2" in which the value is "False". Because it is safer to have the value as "TRUE" in the case when several values with "TRUE" and "FALSE" are mixed, line 2595 indicates that the safer value is "True", and this is the value that is applied when, for example, both data classes "C1" and "C2" are specified. As another example, line 2592 is the parameter of "Preservation Term", and safer column 2550 indicates that it is safer to choose the longest preservation term when several values are selected.

Applied Data Class Table

FIG. 15 illustrates an exemplary data structure of applied data class table 2011. Applied data class table 2011 contains the records of mapping between the managed data (i.e., a user's storage volume 201) and the applied classID of the relevant regulation. Plural records may be stored for a single managed data when there several regulations applicable to the data. The fields of the applied data class table 2011 are as follows:

UserID 2610: Identifies the user who ordered the storage capacity and data management.

StorageVolumeID 2620: Identifies the storage volume 201 that is allocated to the user.

RegulationID 2630: Identifies the regulation for the data class that is being applied to the user's data.

ClassID 2640: Identifies the data class which is being applied to the user's data.

For example, line 2691 represents a record that storage volume "SV_100" of user "UsrA" is managed as a data class "C1" of the regulation "FNC". Line 2692 shows that the same storage volume "SV_100" also has applied to it the parameters of data class "CA" of regulation "MFT". This means the data contained in storage volume "SV_100" should be stored and managed in compliance with both "FNC" and "MFT" regulations. Thus data management parameters are configured for the data so as to cover both regulations. This table 2011 holds not a history, but the current status of the configuration for each storage volume of each user.

Process for Data Classification and Allocating an Appropriately Managed Storage Volume FIGS. 16 and 17 illustrate an exemplary process of data classification and allocation of an appropriately-managed storage volume. The process of this embodiment is similar to the process shown in FIG. 11 and discussed in the first embodiment; however some portions are changed for handling the case of plural regulations selected by the user, and these portions are discussed in greater detail below.

Steps 1501 to 1507: These steps are the same as described above for FIG. 11, but it is assumed that several regulations are checked by the user instead of only one.

Step 2801: Data management conductor 211 selects one of the user checked regulation on the user interface of regulation target field 1000. If every selection of the regulations has been processed then the process proceeds to step 2821, otherwise it proceeds to step 2802.

Step 2802: Data management conductor 211 requests data classification information from the regulation repository manager 221, which information corresponds to the regulation selected in Step 2801.

Step 2803: Regulation repository manager 221 returns a set of records from data class table 223 corresponding to the requested regulation.

Step 2804: Data management conductor 211 generates a screen with a list of obtained data class descriptions (i.e., data classification user interface display 1100 of FIG. 8).

Step 2805: User interface screen 1100 for data classification is displayed on the client software 231.

Step 2806: The user will select a data class of the data to be managed at the SSP, and the selected class is returned to the data management conductor 211.

Step 2807: Data management conductor 221 requests actual data management parameters from the regulation repository manager 221 by specifying the user-selected data class.

Step 2808: Regulation repository manager 221 selects records from data management parameter table where a data class matches the specified class in the request from data management conductor 211.

Step 2809: Regulation repository manager 221 returns a set of parameters to the data management conductor 211.

Step 2810: Data management conductor 211 retains regulationID, classID and data management parameters obtained in Step 2801, 2806, 2809 for each iteration of steps 2801-2810. In the second or later loops data management conductor 211 will not throw out prior parameters even if the parameter type is conflicted, but instead keeps all parameters obtained so far, and proceeds back to step 2801 for the next regulation to be processed.

Step 2821 (FIG. 17): After data management conductor 211 has obtained all the parameters for each regulation, if there are multiple values for the particular parameter, the process loops through step 2821 to step 2823 to resolve any conflicts and optimize the parameters to one proper value for each parameter. In step 2821, data management conductor 211 selects records having the same parameter (e.g., "Preservation Term"). If every parameter has already been processed then the process proceeds to step 1516, otherwise the process proceeds to step 2822.

Step 2822: The process selects the values of "Safer" column 2550 of table 224' of the records selected in step 2821.

Step 2823: The process then selects the record or value which is most safe among the records selected in Step 2821 according to the values obtained in Step 2822. That value becomes the data management value for the selected parameter. The process then proceeds back to step 2821 to process the next parameter. Once all parameters have been processed to select the safest value, the process proceeds to step 1516.

Steps 1516 to 1521 and Step 1522: Same as described above for FIG. 11.

Step 2830: Before ending the process data management conductor 211 inserts new records to the applied data class table 2011 according to the kept classIDs and information obtained in Step 2810. As shown in this embodiment in FIG. 15, data management conductor 211 inserts several records corresponding to the selection of the target regulations' data classes.

Third Embodiment

The third embodiment describes an example of a method of automatic data migration in the case of changes in a regulation resulting in changes in one or more data storage and management parameters. Thus, under the invention, when a regulation is changed for data managed under an affected data class, the invention retrieves new data management parameters corresponding to the affected data classes. Then, a newly-configured storage environment is created for each affected data that the system is currently managing, and the affected data is then moved to newly-configured environment.

Most of the components and behaviors of the third embodiment are same as those described above with respect to the second embodiment. The differences between the second and third embodiments are described in detail below.

Software and Logical Element Structure

FIG. 18 illustrates an exemplary software and logical element structure of this embodiment. On storage management server 110" a user destination table 3011 is added. The user destination table 3011 contains the destination information or URL of each user or client host. The destination information is used for notifying the user (such as via client software 231 or e-mail) of regulation updates when such notification is received at the SSP site 151 from data management regulation repository server 120".

Additionally, on the data management regulation repository server 120" a notification destination table 3021 is added. Notification destination table 3021 contains the destination of SSP site 151 to enable receiving notification of any updates to a particular regulation, and is used by the regulation site 152 for notifying each SSP site 151 of changes to the regulation.

User Destination Table

FIG. 19 illustrates an exemplary data structure of user destination table 3011. User destination table 3011 contains user profile information of the service users of the SSP site, and this information is used when sending notification from data management conductor 211 to the user at client site 153.

User destination table 3011 contains the following fields:

UserID 3210: Identifies the users who are using the service of the SSP.

Destination 3220: Location information to specify the client site contact address. For instance, line 3291 represents a record that destination of user "UsrA" is "www.smba.com:xxxx". To add or update this record could be done by any of numerous ways which are not essential in this invention.

Notification Destination Table

FIG. 20 illustrates an exemplary data structure of notification destination table 3021. Notification destination table 3021 contains the location of the SSP's to enable sending notification/indication of a change in a regulation from regulation repository manager 221 to data management conductor 211. Since all SSPs that have obtained regulation data management information from the regulation site 152 will receive notification of a change to the regulation, notification destination table 3021 contains only a single field, as follows:

Destination 3310: Location information which specifies the SSP site to enable notification reception. For instance, line 3391 represents a record that indicates that one of the SSP's locations is "www.ssp100.com:xxxx". To add destination records to notification destination table 3021 could be accomplished in several different ways, such as by obtaining the location of the SSP when the SSP requests the information from the regulation repository manager 221.

Notification

FIG. 21 shows an example data structure of a notification 3401 that is sent from regulation repository manager 221 to data management conductor 211 when the regulation is updated. Notification 3401 contains the following fields:

RegulationID 3410: Identification of the regulation affected by the update or change.

ClassID 3420: Identification of a data class that is affected by the update to the regulation. This could be a null value when the update is that the Regulation is newly created or deleted.

Parameter 3430: Name or identification for the storage management parameter that is affected by the change to the regulation. This may be a null value when the update is regulation/data class creation or deletion.

UpdateType 3440: Type of the regulation update. This may be "Created", "Removed" or "Modified". Notification 3401 is not a static table that resides on the server 120", but instead is a data structure used for sending information of regulation updates.

Map of Regulation Update and Data Migrating

FIG. 22 illustrates a mapping 3501 that shows how auto migration may be invoked in response to each regulation update type. As illustrated in FIG. 22, when a regulation or a data class is created (lines 3591 and 3593, respectively) then data management conductor 211 just sends notification of that from data management conductor 211 to the users at client sites 153. In the case of other updates to regulations, data classes, or parameters, data management conductor will run the auto migration process (as shown in lines 3592 and 3594-3597), after obtaining the user's permission.

User Interface

FIG. 23 illustrates an exemplary user interface 3600 for providing notification of changes in regulations to a user. User interface 3600 is generated by data management conductor 211 and displayed on the client software 231. A regulation update description 3601 is generated according to the content of the notification 3401 that data management conductor receives from regulation repository manager 221. Auto migration specify table 3610 shows one or more user-related storageVolumeIDs 3611 which are affected by the regulation update and also shows auto migration check boxes 3612 for each affected storage volume. If the user checks on this field that indicates that the user is giving permission for executing the auto migration process for the specified storage volume. An "OK" button 3621 may then be clicked to start auto migration. A "Close" button 3622 may also be provided to enable the user to just close the window so that the migration will not be executed. A "Help" button is also provided to enable the user to obtain more information, if necessary.

Process of Regulation Change Notification and Auto Data Migration

FIGS. 24 and 25 illustrate an exemplary process of regulation change notification and auto data migration. The process includes the following steps:

Step 3801: When a regulation is updated, regulation repository manager 221 sends notifications to all SSP sites that are managing data that is compliant to the regulation. Regulation repository manager 221 refers to the notification destination table to determine the locations of the affected SSP sites 151.

Step 3802: Regulation repository manager 221 creates a notification 3401 (FIG. 21) with the information of regulation update and sends it to every SSP site found in step 3801.

Step 3803: Data management conductor 211 determines affected user data, such as by selecting records from applied data class table 2011 where the regulationID is matched with the content of the notification received.

Step 3804: Data management conductor 211 selects a user from the result of step 3803 above (there may be several records for a single user but it is only necessary to select each affected user once). If all affected users have been processed, then the process ends, otherwise the process proceeds to step 3805.

Step 3805: By the selection in step 3804, data management conductor 211 obtains a destination corresponding to an affected user from user destination table 3011.

Step 3806: Data management conductor 211 generates user interface 3600 of regulation changed notification from the information of received notification and obtained storageVolumeID that relates to the affected user determined in step 3803.

Step 3807: User interface screen 3600 is displayed on the client software at client site 153.

Step 3808: The user selects storage volumes to be auto migrated and the selection will be returned to the data management conductor 211.

Step 3809: Data management conductor 211 selects one of the storage volumes that the affected user specified for auto migration. If all the affected storage volumes have already been processed, then the process proceeds to step 3820, otherwise the process proceeds to step 3810.

Step 3810: If the regulation update type is regulation or data class removed, then the process proceeds to step 3811; otherwise the process proceeds to step 3812.

Step 3811: Data management conductor 211 removes corresponding records from applied data class table where regulationID or classID matches to the removed regulation or class.

Step 3812: Data management conductor 211 selects a record from applied data class table where storageVolumeID matches to the one selected in Step 3809.

Step 3813: By the classID of the record selected in step 3812 data management conductor 211 requests actual data management parameters from the regulation repository manager 221. This is the process to get new parameters after the regulation update.

Step 3814: Regulation repository manager 221 selects records from data management parameter table 224 where data class is matched to the specified class.

Step 3815: Regulation repository manager 221 returns a set of parameters to the data management conductor 211.

Step 3816: Data management conductor retains the obtained data management parameters. In the second or later loops data management conductor 211 retains the previously-obtained parameters even if the parameter type is conflicted. Data management conductor 211 proceeds back to step 3812 for the next affected class.

Step 3820: After data management conductor 211 has finished collecting the new parameters, if there are multiple values for a particular parameter, a process such as was described above for the second embodiment is invoked. Data management conductor 211 loops through steps 3820 to 3822 to optimize the multiple parameters to one proper safest value for the particular parameter. Thus, at step 3820, data management conductor 211 selects records having the same parameter. If every parameter has already been processed then the process proceeds to step 3830; otherwise it proceeds to step 3821.

Step 3821: Get value of "Safer" column of the records selected in Step 3820.

Step 3822: Select a record or value which is most safe among the records selected in Step 3820 according to the rule obtained in Step 3821. That is set as the value for the selected parameter. The process then proceeds back to step 3820 for the next parameter until all conflicted parameters have been addressed.

Step 3830: With the obtained new data management parameters, data management conductor 211 requests the storage manager 214 to migrate data from the current storage volume to new a storage volume to the storage manager. Alternatively, the data management conductor 211 requests storage manager 214 to migrate the parameters of the data management so the storage volume is managed according to the new parameters.

Step 3831: According to the specified parameters, storage manager 214 allocates a new storage volume having the proper data management and storage characteristics and sets up the configuration of the new volume for automatic data management according to the specified parameters.

Step 3832: Storage manager 214 moves data between the old storage volume and the new storage volume, and frees the old storage volume and its data management configurations.

Step 3833: Storage manager 214 ends the migration process. It may be assumed that the identifier of the original storage volume will be transferred to the newly allocated storage volume so that it is not necessary to return a new storageVolumeID to the user.

Step 3840: Data management conductor 211 selects records from data management history table for the original storageVolumeID selected in step 3809 matches and sets its endTime. This means one of the data management periods for the storage volume is ended and is retained as a history record.

Step 3841: Data management conductor 211 records a new log with new parameter values for beginning a new period of data management of that storage volume to the data management history table. The process then returns to step 3804 if there are other users that need to be notified of the change to the regulation.

Thus, it may be seen that the present invention sets forth benefits not found in the prior art, such as:

A user does not have to specify actual data management parameters, but just responds to inquiries so that the parameters may be automatically determined.

The present invention reduces the costs of hiring outside consultants on the user's side, and enables the SSP to deal with a plurality of companies without requiring intervention by human consultants.

The invention is able to provide users with certificates demonstrating appropriate data management for inspection or auditing purposes. The certificates may be filtered by each user, and each certificate may contain a specified or complete period of history of the data management.

Data management configurations may be automatically migrated to meet the latest definition or updates to a regulation.

The invention provides a simple and basic method to classify the user's data by the class definition of the regulations, and thereby is able to obtain appropriately managed storage capacity.

From the foregoing, it will be apparent that the present invention enables the SSP to provide a service to users for appropriate data management of the users' data, and also automatically configures the storage volume with an appropriate data management configuration. The present invention meets a demand of small and middle size of businesses, which often do not possess detailed knowledge about the data management regulations with which they must be compliant, and which also often do not have enough budget or human resources to become compliant.

Further, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A method for managing storage of data in a storage system, comprising:

receiving, at a data storage site, a request from a user for storing user's data;

presenting the user with an interface that enables the user to select a business field to enable the data storage site to generate a data class information that applies to the user's business field, the interface further enabling the user to select a data class from the data class information;

requesting, by the data storage site, data management parameters corresponding to the data class selected for the user from a regulation information managing site;

receiving, at the data storage site, data management parameters for storing the user's data; and allocating storage capacity at the data storage site for storing the user's data in accordance with the data management parameters received from the regulation information managing site.

2. The method of claim 1, further including the steps of:

receiving, by the data storage site, notification from the regulation information managing site of a change to one or more of said parameters; and migrating the user's data to a storage condition in accordance with one or more new parameters corresponding to the change.

3. The method of claim 1, further including the steps of:

generating, by the data storage site, a display to the user with a list of gathered target field descriptions to determine possible data classes for the user's data; and selecting, by the user, at least one target field description relevant to the user's data.

4. The method of claim 3, further including the steps of:

selecting, by the storage site, a regulation corresponding to the target field description selected by the user;

requesting, by the storage site, data classification information from the regulation information management site corresponding to the regulation; and generating, by the storage site, a data class list containing one or more data classes corresponding to the regulation.

5. The method of claim 1, wherein the step of allocating storage capacity at the data storage site for storing the user's data further includes the step of allocating at least one logical storage volume for storing the user's data in accordance with the parameters.

6. The method of claim 1, wherein the interface enables the user to select a regulation that applies to storage of the user's data, the method further including the steps of:

sending a request, by the user, to the data storage site requesting a data management certificate for the user's data that indicates that the user's data has been properly managed as defined in the regulation; and returning to the user, from the data storage site, records regarding storage of the user's data including periods of time, storage management parameters and respective parameter values.

7. The method of claim 1, wherein the interface enables the user to select a first data class corresponding to a first regulation and a second data class corresponding to a second regulation, wherein said first data class includes a first parameter having a first value and said second data class includes a second parameter having a second value, and wherein when said first parameter is the same as said second parameter, said data storage site chooses a safest value from among the first and second values for setting the first and second parameters, the safest value being chosen from a standpoint of providing greatest data protection.

8. The method of claim 7, wherein when said first and second parameters are both overwrite prevention, and said first value is to enforce overwrite prevention and said second value is to not enforce overwrite prevention, the safest value that is chosen is to enforce overwrite prevention.

9. The method of claim 7, wherein when said first and second parameters specify a preservation term, and said first value specifies a term shorter than said second value, the safest value that is chosen is the second value.

10. The method of claim 2, further including the step of:
obtaining, by said storage site, said one or more new parameters from said regulation information management site following receipt of notification of the change.

11. The method of claim 10, further including the step of:
obtaining consent of the user prior to migrating the user's data.

12. A system for managing storage of a user's data so as to be in compliance with one or more regulations, comprising:
a first site having a first server and one or more storage devices;
a second site, in communication with said first site, and having a second server serving information on said one or more regulations; and
a third site, in communication with said first site, and through which a user is able to request storage services for the user's data for storing the user's data on said first site,
wherein a management module on the first site receives a business field selected by the user and generates a data class information that applies to the user's business field,
wherein the management module receives a data class selected from the data class information by the user regarding the user's data, and
wherein said management module requests storage parameters corresponding to the data class from said second site for storing the user's data.

13. The system of claim 12, wherein:
said management module instructs the allocation of a storage volume on said storage device for storing the user's data in accordance with the parameters.

14. The system of claim 12, wherein:
said management module receives notification from the second site of a change to one or more of said parameters; and
said management module instructs the migration of the user's data to a new storage volume on said storage device for storing the user's data in accordance with one or more new parameters corresponding to the change.

15. The system of claim 14, wherein:
wherein said management module receives approval from the user prior to instructing the migration of the user's data.

16. The system of claim 12, wherein:
wherein the management module receives a relevant regulation that is selected by the user and corresponds to the user's data,
said management module receives a request, by the user, requesting a data management certificate for the user's data that indicates that the data has been properly managed as defined by the relevant regulation; and
the management module returns, to the user, records regarding storage of the user's data including periods of time, storage management parameters and respective parameter values.

17. A method for managing storage of a user's data in a storage system so as to be in compliance with one or more regulations, said storage system being located at a first site, said first site being in communication with at least one second site managing information for said regulations, said first site also being in communication with at least one user at a third site, the method comprising:
receiving, at the first site, a request from the user for storing the user's data on the storage system at the first site;
generating, by the first site, a graphic interface that enables the user to select a business field to enable the first site to generate a data class information that applies to the user's business field, the graphic interface further enabling the user to select a data class from the data class information;
requesting from the second site, by the first site, data management parameters corresponding to the selected data class applicable to the user's data;
receiving, at the first site, the data management parameters for storing the user's data; and
allocating storage capacity, at the first site, for storing the user's data, said storage capacity being allocated and managed in accordance with the data management parameters received from the second site.

18. The method of claim 17, further including the steps of:
receiving, by the first site, notification from the second site of a change to one or more of said parameters; and
migrating the user's data to a new storage condition in accordance with one or more new parameters corresponding to the change.

19. The method of claim 17, wherein the graphic interface enables the user to select a regulation that applies to storage of the user's data, the method further including the steps of:
sending a request, by the user, to the first site requesting a data management certificate for the user's data that indicates that the data has been properly managed as defined in the regulation; and
returning, to the user, from the first site, records regarding storage of the user's data including periods of time, storage management parameters and respective parameter values.

20. The method of claim 1, wherein the data management parameters include at least one of overwrite prevention, preservation term, remote redundancy, or latency to the first byte.

* * * * *